(12) United States Patent
McFarland et al.

(10) Patent No.: US 7,340,120 B2
(45) Date of Patent: Mar. 4, 2008

(54) OPTICAL AND ELECTRICAL INTERCONNECT

(75) Inventors: Jonathan McFarland, Tempe, AZ (US); Kannan Raj, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 383 days.

(21) Appl. No.: 11/020,985

(22) Filed: Dec. 22, 2004

(65) Prior Publication Data

US 2005/0104178 A1 May 19, 2005

Related U.S. Application Data

(62) Division of application No. 09/846,032, filed on Apr. 30, 2001, now Pat. No. 6,847,747.

(51) Int. Cl.
*G02B 6/12* (2006.01)

(52) U.S. Cl. .................. 385/14; 385/131; 385/147

(58) Field of Classification Search .................. 385/14, 385/51, 88–94, 129–132, 147
See application file for complete search history.

(56) References Cited

U.S. PATENT DOCUMENTS

| | | | |
|---|---|---|---|
| 3,663,194 A | 5/1972 | Greenstein et al. |
| 4,113,981 A | 9/1978 | Fujita et al. |
| 4,252,391 A | 2/1981 | Sado |
| 4,548,862 A | 10/1985 | Hartman |
| 5,136,359 A | 8/1992 | Takayama et al. |
| 5,188,702 A | 2/1993 | Takayama et al. |
| 5,262,226 A | 11/1993 | Yoshida |
| 5,312,765 A | 5/1994 | Kanber |
| 5,428,190 A | 6/1995 | Stopperan |

(Continued)

FOREIGN PATENT DOCUMENTS

CN 1259008 7/2000

(Continued)

OTHER PUBLICATIONS

Delaney, Drew, et al., "Flip Chip Assembly Utilizing Anisotropic Conductive Films: A Feasibility Study", *2000 Electronic Components and Technology Conference*, (2000), 641-645.

(Continued)

*Primary Examiner*—Kevin S. Wood
(74) *Attorney, Agent, or Firm*—Schwegman, Lundberg & Woessner, P.A.

(57) ABSTRACT

A method of fabricating an interconnect includes forming one or more holes in an anisotropic conductive film on a carrier substrate, filling at least one of the one or more holes with a material capable of transmitting an optical signal, and laminating the anisotropic conductive film on a packaging substrate. An electronic package includes a first substrate, a second substrate, and an interconnect located between the first substrate and the second substrate. The interconnect includes a conductive film for electrically coupling a first terminal formed on the first substrate to a second terminal formed on the second substrate, and one or more optically transmissive units embedded in the conductive film, wherein at least one of the one or more optically transmissive units provides an optical signal path between an optical element on the first substrate and an optical element on the second substrate.

15 Claims, 4 Drawing Sheets

U.S. PATENT DOCUMENTS

| | | | |
|---|---|---|---|
| 5,502,889 | A | 4/1996 | Casson et al. |
| 5,502,891 | A | 4/1996 | Mori et al. |
| 5,591,034 | A | 1/1997 | Ameen et al. |
| 5,604,379 | A | 2/1997 | Mori |
| 5,679,493 | A | 10/1997 | Kai |
| 5,681,647 | A | 10/1997 | Caillat |
| 5,688,584 | A | 11/1997 | Casson et al. |
| 5,727,310 | A | 3/1998 | Casson et al. |
| 5,770,305 | A | 6/1998 | Terasaka |
| 5,783,465 | A | 7/1998 | Canning et al. |
| 5,879,530 | A | 3/1999 | Caillat |
| 6,031,590 | A | 2/2000 | Kim |
| 6,218,629 | B1 | 4/2001 | Brofman et al. |
| 6,238,597 | B1 | 5/2001 | Yim et al. |
| 6,574,020 | B1 | 6/2003 | Ovens |
| 6,847,747 | B2 * | 1/2005 | McFarland et al. ........... 385/14 |
| 2002/0097962 | A1 | 7/2002 | Yoshimura et al. |

FOREIGN PATENT DOCUMENTS

| | | |
|---|---|---|
| EP | 0487918 | 6/1992 |
| EP | 0487918 A2 | 6/1992 |
| WO | WO-90/01176 | 2/1990 |
| WO | WO-00/60673 | 10/2000 |

OTHER PUBLICATIONS

"Non-final office action mailed Apr. 19, 2004 in U.S. Appl. No. 09-846032", 9 pgs.

"Non-final office action mailed May 7, 2003 in U.S. Appl. No. 09-846032", 7 pgs.

"Non-final office action mailed Dec. 08, 2003 in U.S. Appl. No. 09-846032", 9 pgs.

"Notice of allowance mailed Sep. 13, 2004 in U.S. Appl. No. 09-846032", 5 pgs.

"Response filed Jan. 07, 2004 to non-final office action mailed Dec. 08, 2003 in U.S. Appl. No. 09-846032", 9 pgs.

"Response filed May 19, 2004 to non-final office action mailed Apr. 19, 2004 in U.S. Appl. No. 09-846032", 9 pgs.

"Response filed May 22, 2004 to non-final office action mailed May 7, 2003 in U.S. Appl. No. 09-846032", 14 pgs.

* cited by examiner

OPTICAL AND ELECTRICAL INTERCONNECT

This application is a divisional of U.S. patent application Ser. No. 09/846,032, filed on Apr. 30, 2001 now U.S. Pat. No. 6,847,747, which is incorporated herein by reference.

FIELD

The present invention is related to connecting signals between substrates in an electronic package and, more particularly, to interconnects used in connecting electronic and optical signals between substrates in an electronic package.

BACKGROUND

Electrical interconnects are conductive structures that carry signals and information in modern electronic systems, such as computers, cellular telephones, and personal digital assistants. Substrates, including dice and packaging substrates, are the building blocks of modern electronic systems. Dice are electronic components made up of diodes, transistors, resistors, capacitors, and inductors that perform the electronic functions required in modern electronic systems. Packaging substrates provide a platform for mounting and interconnecting dice and other electronic components, such as resistors, capacitors, and inductors. Electrical interconnects connect together electronic components on and between dice and packaging substrates.

Electrical interconnects are a significant information transmission bottleneck in modern communication and computation systems. Information encoded in electronic signals is transmitted between electronic components over electrical interconnects in modern communication and computation systems. Electrical interconnects are often unable to transfer information at the high data rates that modern systems require. One reason for this is that electrical interconnects are often fabricated from conductive materials, such as metals, which have several inherent electrical limitations. First, electrical interconnects are susceptible to noise pick-up from neighboring conductors.

Second, electrical interconnects have a finite resistance which when coupled to parasitic capacitances limits the speed at which information can be transmitted on the interconnects.

For these and other reasons there is a need for the present invention.

DESCRIPTION

Figure 1A:
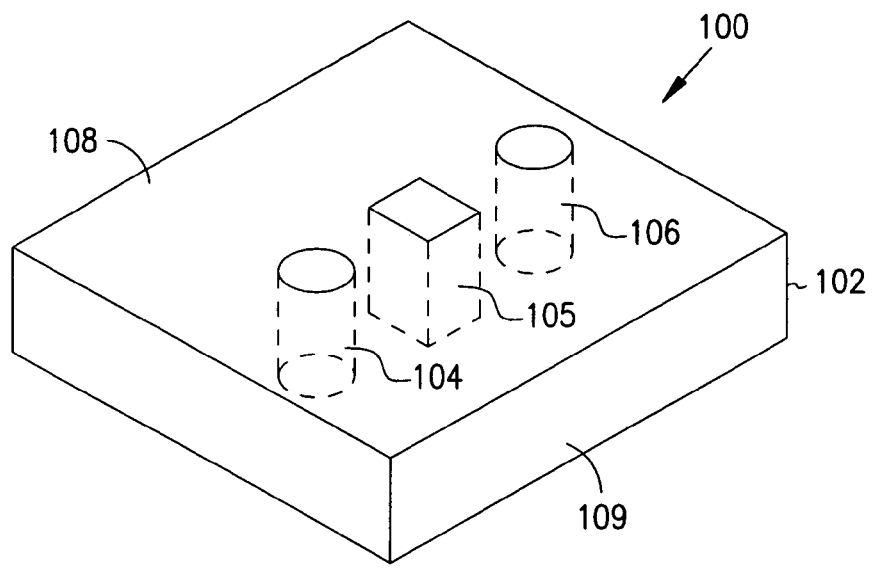
FIG. 1A is a perspective view of one embodiment of an interconnect according to the teachings of the present invention.

In the following detailed description of the invention, reference is made to the accompanying drawings which form a part hereof, and in which are shown, by way of illustration, specific embodiments of the invention which may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is not to be taken in a limiting sense, and the scope of the present invention is defined only by the appended claims, along with the full scope of equivalents to which such claims are entitled.

FIG. 1A is a perspective view of one embodiment of an interconnect 100 according to the teachings of the present invention. The interconnect 100 includes an anisotropic conductive film 102 and optically transmissive units 104-106 embedded in the anisotropic conductive film 102.

Figure 1B:
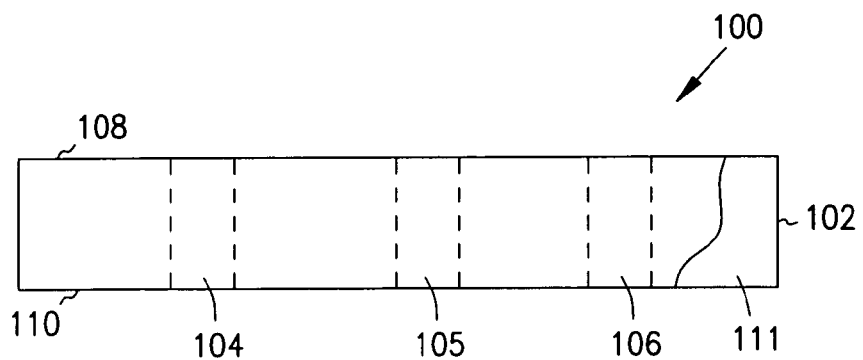
FIG. 1B is a side view of the interconnect shown in FIG. 1A.

FIG. 1B is a side-view of the interconnect 100 shown in FIG. 1A. The side-view is taken at surface 109 of the interconnect 100 shown in FIG. 1A. As can be seen in FIG. 1B, each of the optically transmissive units 104-106 provides an optically transmissive path through the anisotropic conductive film 102. Thus, each of the optically transmissive units 104-106 provides a path for coupling optical signals from the first surface 108 of the interconnect 100 to the second surface 110 of the interconnect 100 and from the second surface 110 of the interconnect 100 to the first surface 108 of the interconnect 100.

The interconnect 100, in the embodiment shown in FIG. 1A and FIG. 1B, includes three optically transmissive units 104-106. However, the interconnect 100 is not limited to use in connection with three optically transmissive units. The interconnect 100 can be fabricated with as many or as few optically transmissive units as a particular application requires. In the embodiment shown in FIG. 1A, the interconnect 100 has a first surface 108 that is substantially rectangular. However, the first surface 108 of the interconnect 100 is not limited to a substantially rectangular shape. The first surface 108 can be formed to any shape that a particular application requires.

Optically transmissive units 104 and 106, in one embodiment as shown in FIG. 1A, have a substantially cylindrical shape. Optically transmissive unit 105, in one embodiment as shown in FIG. 1A, has a substantially rectangular shape. However, the optically transmissive units 104-106 are not limited to a particular shape. Any shape that is capable of transmitting optical energy is suitable for use in the fabrication of optically transmissive units 104-106. Thus, the optically transmissive units 104-106 can be shaped to efficiently transmit electromagnetic radiation from a variety of sources, including die mounted (not shown) lasers, such as vertical cavity surface emitting lasers, laser diodes, and diodes, and externally mounted (not shown) lasers, laser diodes, and diodes.

Optically transmissive units 104-106 are not limited to being fabricated using a particular material. In one embodiment, optically transmissive units 104-106 comprise free space. In an alternative embodiment, optically transmissive units 104-106 are fabricated from an optical polymer. Exemplary optical polymers suitable for use in connection with the fabrication of optically transmissive units 104-106 include acrylic acrylates, polycarbonates, or polyacrylates. Preferably, the optical polymers selected for the fabrication of the optically transmissive units 104-106 are curable using ultraviolet radiation.

The optically transmissive units 104-106 can function as optical vias in modern electronic systems. A via is an interconnection for coupling together components in electronic systems. A via can couple together components on a single substrate or components on multiple substrates. Vias in modern electronic systems are generally conductive elements. However, optically transmissive units 104-106 can also function as vias to couple optical signals between components in an electronic system. Those skilled in the art will appreciate that the use of optically transmissive units 104-106 as vias in an electronic system can increase the bandwidth of the system.

Figure 1C:
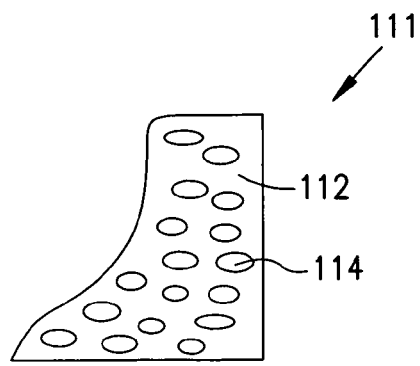
FIG. 1C is magnified view of a section of the anisotropic film of the interconnect shown in FIG. 1B.

FIG. 1C is a magnified view of section 111 of the anisotropic conductive film 102 of the interconnect 100 shown in FIG. 1B. As can be seen in FIG. 1C, the section 111 of the anisotropic conductive film 102 includes a carrier 112 and one or more conductive particles 114 embedded in the carrier 112. In one embodiment, the carrier 112 is a substantially compliant insulative material. Exemplary substantially compliant insulative materials include epoxies and adhesives.

In one embodiment, each of the one or more conductive particles 114 is fabricated from a conductive material. Exemplary conductive materials suitable for use in the fabrication of the one or more conductive particles 114 include metals and semiconductors.

Exemplary metals suitable for use in the fabrication of the one or more conductive particles 114 include nickel, aluminum, copper, gold, silver, and alloys of nickel, aluminum, copper, gold and silver. Exemplary semiconductors suitable for use in the fabrication of the one or more conductive particles 114 include silicon, germanium, and gallium arsenide.

Figure 1D:
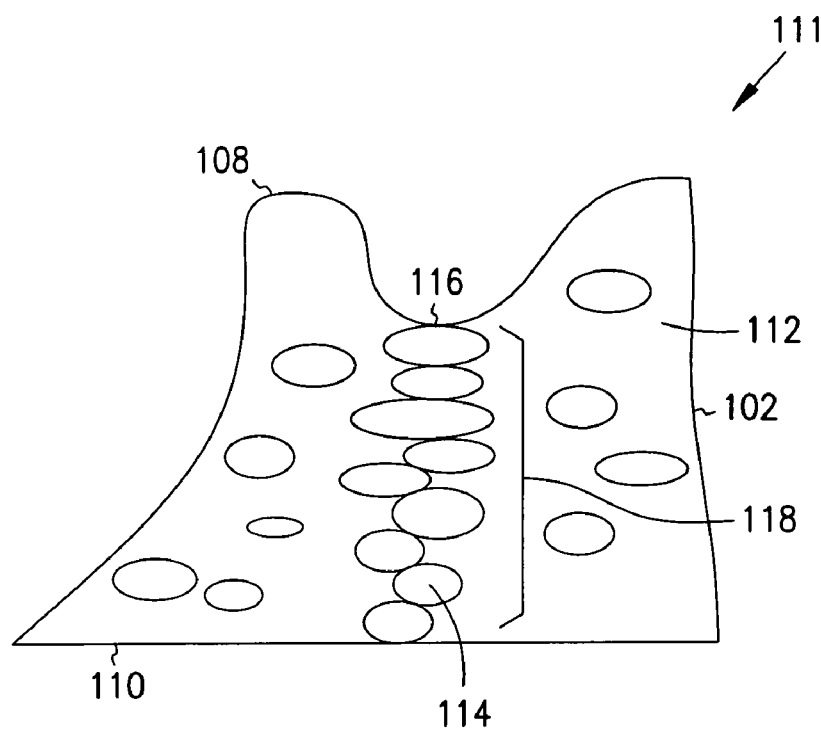
FIG. 1D shows a section of the anisotropic film of the interconnect shown in FIG. 1C after compression.

FIG. 1D shows the section 111 of the anisotropic conductive film of FIG. 1C after compression. As can be seen in FIG. 1D, after compression of the anisotropic film 102 at a point of compression 116, a conductive path 118 is formed between the point of compression 116 and the second surface 110 by a subset of the one or more conductive particles 114. The density of the one or more conductive particles 114 in the carrier 112 and the compliancy of the carrier 112 are selected such that, with the carrier compressed as shown in FIG. 1D, a subset of the one or more conductive particles 114 forms the conductive path 118 between the first surface 108 at the point of compression 116 and the second surface 110. The point of compression 116 is the location on the first surface 108 at which an electrical connection can be made to the conductive path 118.

Figure 1E:
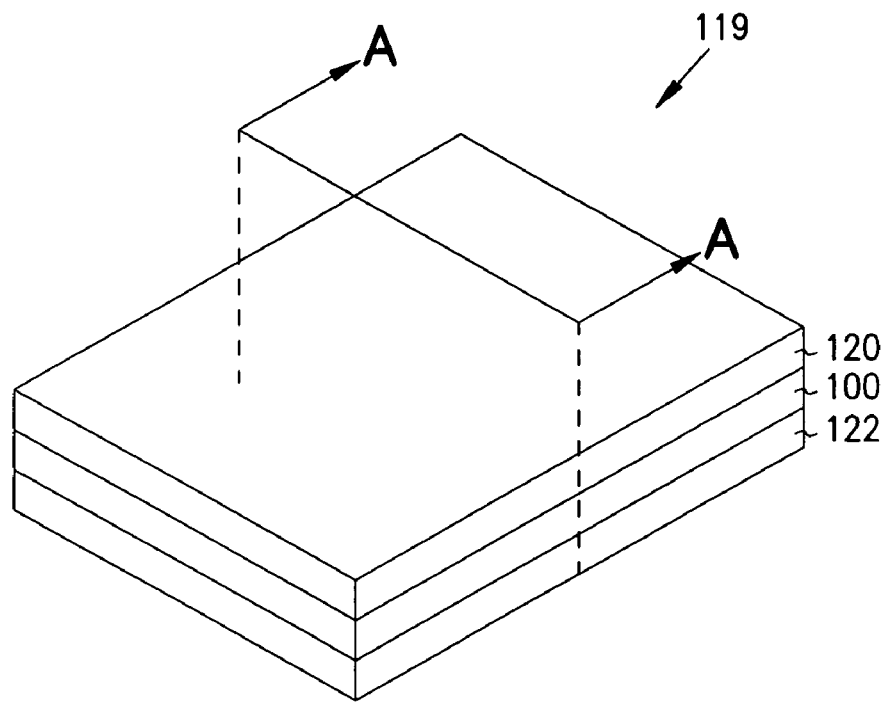
FIG. 1E is a exploded view of one embodiment of an interconnect located between a first substrate and a second substrate according to the teachings of the present invention.

FIG. 1E is a perspective view of one embodiment of an electronic package 119 according to the teachings of the present invention. The electronic package 119 includes interconnect 100 located between a first substrate 120 and a second substrate 122. In one embodiment, the first substrate 120 comprises a die including electrical optical circuits (not shown), and the second substrate 122 comprises a carrier substrate including electrical and optical signal carrying paths (not shown). However, the first substrate 120 is not limited to a particular type of die, and the second substrate 122 is not limited to a particular type of carrier substrate. Exemplary dice suitable for use in connection with the present invention include microprocessor, digital signal processor, or application specific integrated circuit dice. Exemplary substrates suitable for use in connection with the present invention include single-die ceramic carriers and multi-die ceramic carriers. After the first substrate 120, the second substrate 122, and the interconnect 100 are assembled into the electronic package 119, the interconnect 100 provides electrical and optical signal paths (not shown) for transmitting electrical and optical signals between the first substrate 120 and the second substrate 122 and between the second substrate 122 and the first substrate 120.

Those skilled in the art will appreciate that FIG. 1E shows only one embodiment of the electronic package 119, and that the electronic package 119 is not limited to being fabricated using only two substrates as shown in FIG. 1E. Three or more substrates can be optically and electrically coupled together using the teachings of the present invention. In one embodiment, a die substrate is electrically and optically coupled to a ceramic substrate, and the ceramic substrate is electrically and optically coupled to a motherboard substrate.

Figure 1F:
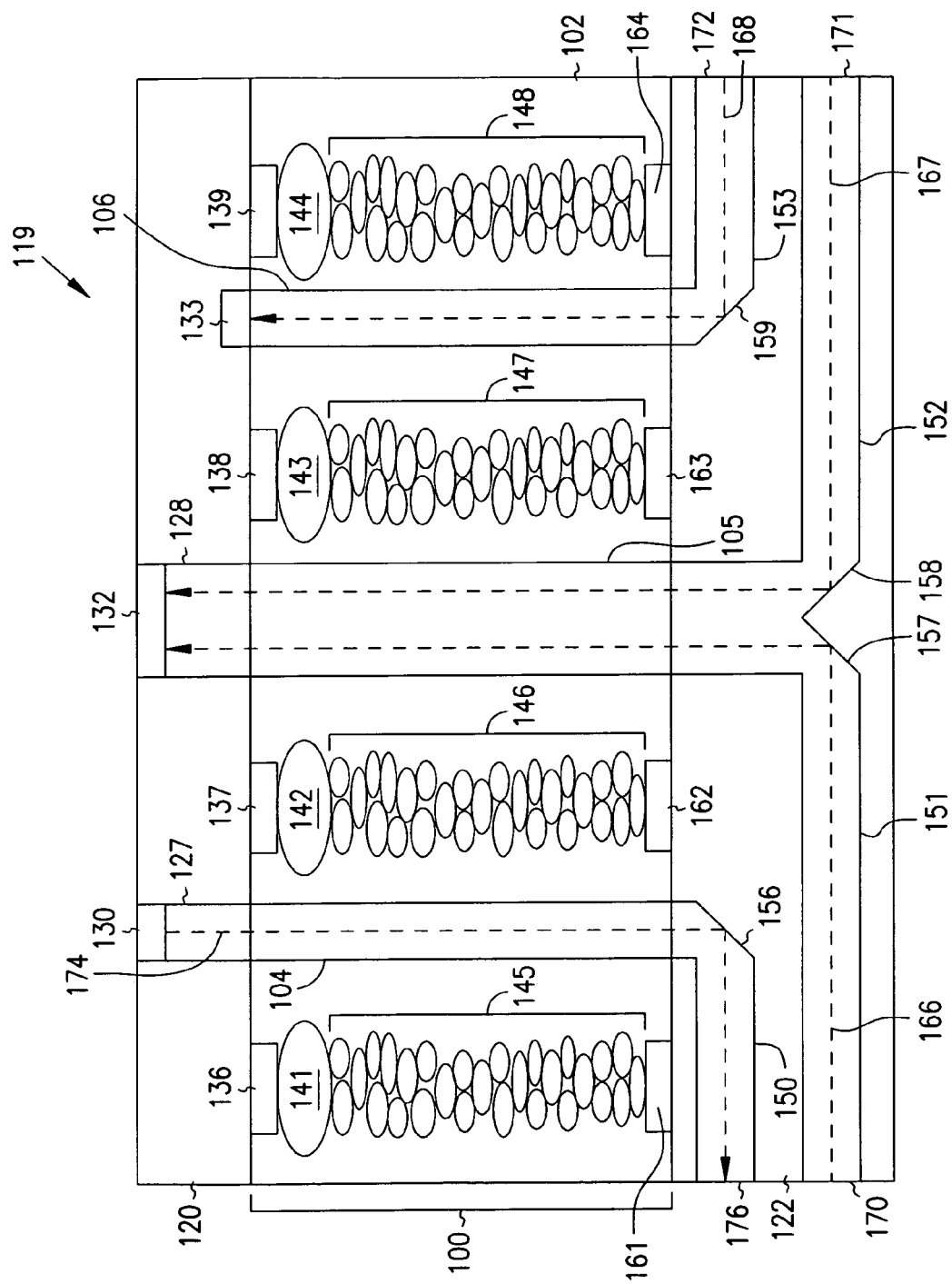
FIG. 1F is a cross-sectional view of the interconnect located between the first substrate and the second substrate of FIG. 1E taken along the line A-A.

FIG. 1F is a cross-sectional view of the electronic package 119 shown in FIG. 1E taken along the line A-A. The electronic package 119 includes the first substrate 120, the second substrate 122, and the interconnect 100 located between the first substrate 120 and the second substrate 122. The first substrate 120 includes optical paths 127-128, optical transmitter 130, optical receivers 132-133, terminals or die pads 136-139, and conductive solder elements 141-144. The interconnect 100 includes optically transmissive units 104-106, conductive paths 145-148, and anisotropic conductive film 102. The second substrate 122 includes optical paths 150-153, reflectors 156-159, and electrically conductive terminals or pads/lands 161-164. Each of the optical paths includes one of the reflectors 156-159 for deflecting an optical beam.

As can be seen in FIG. 1F, the interconnect 100 is compressed at conductive solder elements 141-144 to form the electrically conductive paths 145-148 between each of the conductive solder elements 141-144 on the first substrate 120 and the electrically conductive terminals or pads/lands 161-164 on the second substrate 122. Thus, each of the electrically conductive paths 145-148 provides a path for coupling an electrical signal from the first substrate 120 to the second substrate 122 and from the second substrate 122 to the first substrate 120. Also, as can be seen in FIG. 1F, the interconnect 100 provides optical paths at optically transmissive units 104-106 for coupling optical signals between the first substrate 120 and the second substrate 122. The sources of optical signals 166-168 are not shown in FIG. 1F, however those skilled in the art will appreciate that exemplary sources of optical signals 166-168 include but are not limited to lasers, vertical cavity surface emitting lasers, diodes, and laser diodes. Those skilled in the art will also appreciate that optical signals can be coupled to optical input ports 170-172.

In operation, the second substrate 122 receives the optical signals 166-168 at optical input ports 170-172, respectively, and the first substrate 120 transmits optical signal 174 from optical transmitter 130 to optical output port 176 on the second substrate 122. In addition, electrical signals, such as digital or analog signals, are transmitted between the first substrate 120 and the second substrate 122. The electrical signals transmitted between the first substrate 120 and the second substrate 122 traverse paths that include the terminals or die pads 136-139, the conductive solder elements 141-144, the conductive paths 145-148, and the terminals or pads/lands 161-164.

The optical signal 166, after arriving at the optical input port 170, travels along the optical path 151 to the reflector 157. At the reflector 157, the optical signal 166 is deflected into the optically transmissive unit 105. The optical signal 166 travels through the optically transmissive unit 105 to the optical receiver 132 on the first substrate 120.

The optical receiver 132 receives and processes the optical signal 166 or receives and converts the optical signal 166 to an electrical signal for further processing. The optical signal 167, after arriving at the optical input port 171, travels along the optical path 152 to the reflector 158. At the reflector 158 the optical signal 167 is deflected into the optically transmissive unit 105. The optical signal 167 travels through optically transmissive unit 105 to the optical path 128 on the first substrate 120. The optical signal 167 travels along optical path 128 to the optical receiver 132 on the first substrate 120. The optical receiver 132 receives and processes the optical signal 167 or receives and converts the optical signal 167 to an electrical signal for further processing. The optical receiver 132, in one embodiment, comprises a single optical receiver. In an alternative embodiment, the optical receiver 132 comprises a plurality of optical receivers.

Thus, optical signals 166 and 167 are both transmitted through the optically transmissive unit 105. Those skilled in the art will appreciate that each of the optically transmissive units 104-106 can route a plurality of optical signals between the first substrate 120 and the second substrate 122.

The optical signal 168, after arriving at the optical input port 172, travels along the optical path 153 to the reflector 159. At the reflector 159 the optical signal 168 is deflected into the optically transmissive unit 106. The optical signal 168 travels through the optically transmissive unit 106 to the optical receiver 133 on the first substrate 120. The optical receiver 133 receives the optical signal 168 and processes the optical signal 168 or converts optical signal 168 to an electrical signal for further processing. The optical receiver 133, in one embodiment, comprises a single optical receiver. In an alternative embodiment, the optical receiver 133 comprises a plurality of optical receivers.

The optical transmitter 130 generates an optical signal 174 on the first substrate 120. The optical signal 174 travels along the optical path 127 to the optically transmissive unit 104. The optical signal 174 travels through the optically transmissive unit 104 and to the optical path 150 on the second substrate 122. The optical signal 174 travels along the optical path 150 to the reflector 156 and is deflected along the optical path 150 to the optical output port 176.

Thus, the interconnect 100 provides an interconnect that permits transmission of optical and electrical signals from the first substrate 120 to the second substrate 122 and from the second substrate 122 to the first substrate 120.

Those skilled in the art will appreciate that the optical signals passing through the optically transmissive units 104-106 are substantially immune from electrical interference, such as cross-talk from electrical signals passing through the conductive paths 145-148. In addition, the optical signals passing through the optically transmissive units 104-106 do not interfere with the electrical signals being transmitted through the electrically conductive paths 145-148. In one embodiment, the signal passing through the at least one of the optically transmissive units 104-106 is a clock signal.

Those skilled in the art will also appreciate that optical signals passing through the optically transmissive units 104-106 are immune from parasitic capacitances, which allows signals to be transmitted through the optically transmissive units 104-106 at higher frequencies than signals transmitted on the electrically conductive paths 145-148.

Figure 2:
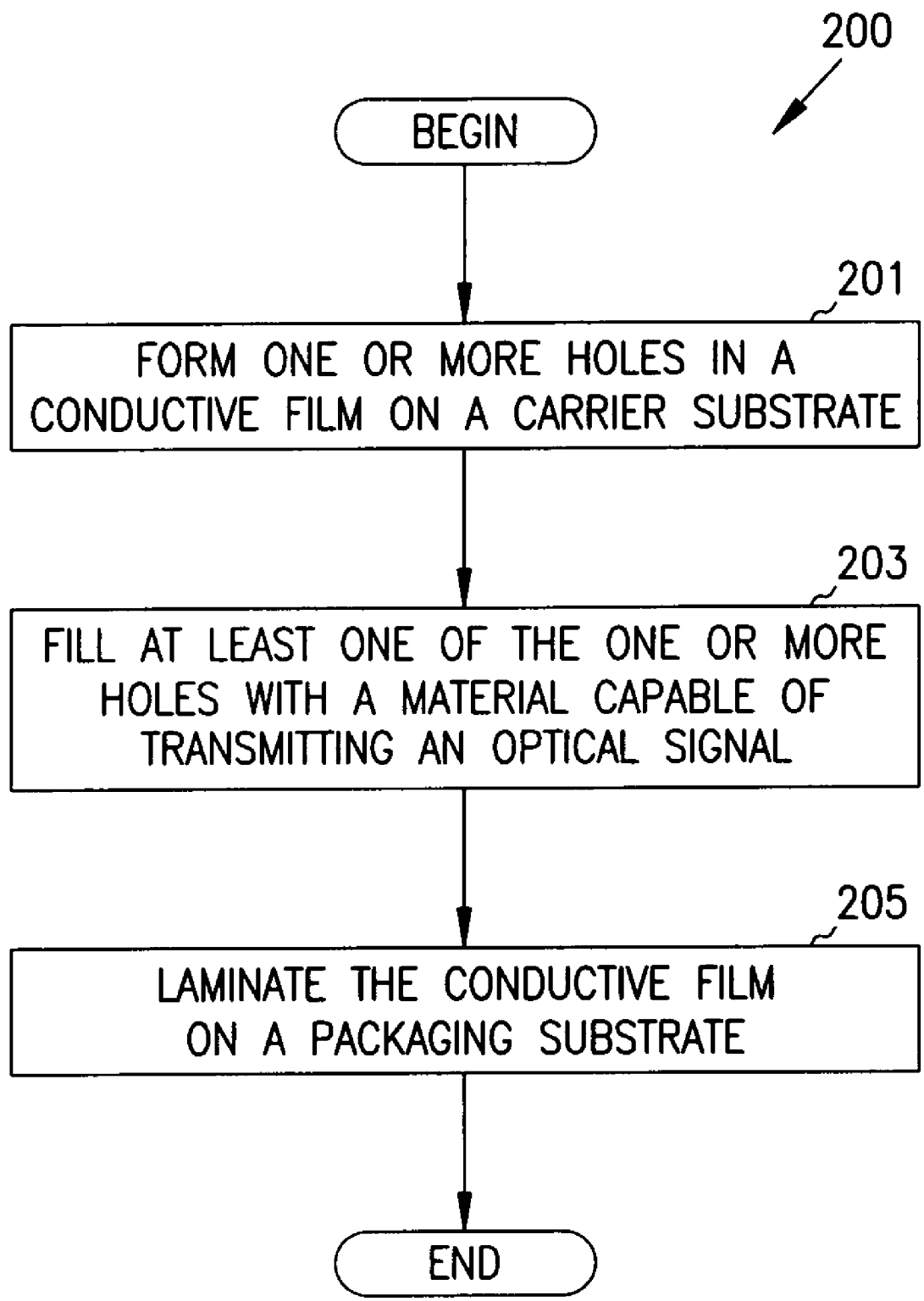
FIG. 2 is a flow diagram of one embodiment of a method of fabricating an interconnect according to the teachings of the present invention.

FIG. 2 is a flow diagram of one embodiment of a method 200 of fabricating an interconnect according to the teachings of the present invention. Method 200 includes forming one or more holes in a conductive film on a carrier substrate (block 201), filling at least one of the one or more holes with a material capable of transmitting an optical signal (block 203), and laminating the conductive film on a packaging substrate (block 205). In an alternative embodiment, forming one or more holes in the conductive film comprises patterning the conductive film to form a patterned conductive film and etching the one or more holes in the patterned conductive film. In another alternative embodiment, filling at least one of the one or more holes with a material capable of transmitting an optical signal comprises filling at least one of the one or more holes with an optical polymer.

Although specific embodiments have been described and illustrated herein, it will be appreciated by those skilled in the art, having the benefit of the present disclosure, that any arrangement which is intended to achieve the same purpose may be substituted for a specific embodiment shown. This application is intended to cover any adaptations or variations of the present invention. Therefore, it is intended that this invention be limited only by the claims and the equivalents thereof.

What is claimed is:

1. An electronic package comprising:
 a first substrate;
 a second substrate; and
 an interconnect located between the first substrate and the second substrate, the interconnect comprising:
  a conductive film for electrically coupling a first terminal formed on the first substrate to a second terminal formed on the second substrate, wherein the conductive film includes an anisotropic conductive film; and
  one or more optically transmissive units embedded in the conductive film, wherein at least one of the one or more optically transmissive units provides an optical signal path between an optical element on the first substrate and an optical element on the second substrate.

2. The electronic package of claim 1, wherein the first substrate includes one or more terminals and one or more devices providing a signal adapted for transmission along the optical signal path.

3. The electronic package of claim 1, wherein the anisotropic conductive film contains a plurality of conductive particles which form a conductive path when the anisotropic conductive film is compressed between the first terminal and the second terminal.

4. The electronic package of claim 3, wherein the first substrate includes a die.

5. The electronic package of claim 4, wherein the die includes a processor.

6. The electronic package of claim 3, wherein the second substrate includes one or more electrical interconnects and one or more optical paths aligned with the optical element.

7. The electronic package of claim 6, wherein the anisotropic conductive film includes an adhesive, anisotropic conductive film.

8. The electronic package of claim 7, wherein the one or more optically transmissive units includes an optical via.

9. The electronic package of claim 8, wherein the optical via is formed from an optical polymer.

10. The electronic package of claim 9, wherein the optical polymer includes an acrylic acrylate.

11. The electronic package of claim 9, wherein the optical polymer includes a polycarbonate.

12. The electronic package of claim 9, wherein the optical polymer includes a polyacrylate.

13. The electronic package of claim 1, wherein at least one of the one or more optically transmissive units to transmit a clock signal.

14. The electronic package of claim 1, wherein at least one of the one or more optically transmissive units is curable using ultraviolet radiation.

15. The electronic package of claim 1, wherein at least one of the one or more optically transmissive units includes a via.

* * * * *